United States Patent
McIver et al.

(10) Patent No.: US 8,020,673 B2
(45) Date of Patent: Sep. 20, 2011

(54) BRAKING SYSTEM FOR HIGH SPEED AND POWER ROTATING MACHINERY

(75) Inventors: Carl R. McIver, Everett, WA (US);
Kevin E. McCrary, Graham, WA (US);
John R. Hull, Sammamish, WA (US);
John A Mittleider, Kent, WA (US)

(73) Assignee: The Boeing Company, Chicago, IL (US)

( * ) Notice: Subject to any disclaimer, the term of this patent is extended or adjusted under 35 U.S.C. 154(b) by 933 days.

(21) Appl. No.: 11/830,549

(22) Filed: Jul. 30, 2007

(65) Prior Publication Data
US 2009/0033145 A1 Feb. 5, 2009

(51) Int. Cl.
*F16D 55/02* (2006.01)
(52) U.S. Cl. ............ 188/71.6; 188/264 F; 188/250 B
(58) Field of Classification Search .......... 188/71.5, 188/71.6, 264 E, 71.1, 71.4, 72.3, 72.4, 73.2, 188/73.43, 73.44, 73.47, 79.59, 79.63, 166, 188/167, 264 R, 264 B, 264 D, 264 F, 264 CC, 188/257, 250 G, 250 B
See application file for complete search history.

(56) References Cited

U.S. PATENT DOCUMENTS

| | | | | |
|---|---|---|---|---|
| 2,518,016 | A * | 8/1950 | Johnson et al. | 188/71.5 |
| 2,621,768 | A * | 12/1952 | Cardwell et al. | 192/85.09 |
| 2,922,056 | A * | 1/1960 | Jaeschke | 310/93 |
| 3,007,562 | A * | 11/1961 | Aschauer | 192/113.34 |
| 3,420,342 | A * | 1/1969 | Botterill | 188/264 F |
| 3,507,375 | A * | 4/1970 | Ryland | 192/85.4 |
| 3,516,522 | A | 6/1970 | Chamberlain | |
| 4,014,410 | A | 3/1977 | Bryant | |
| 4,027,758 | A * | 6/1977 | Gustavsson et al. | 192/113.36 |
| 4,102,438 | A * | 7/1978 | Rancourt | 188/18 A |
| 4,609,076 | A | 9/1986 | Collins et al. | |
| 4,799,575 | A * | 1/1989 | Kroniger | 188/71.6 |
| 5,205,384 | A * | 4/1993 | Heshmat | 188/264 B |
| 5,495,927 | A * | 3/1996 | Samie et al. | 192/70.12 |
| 5,954,166 | A * | 9/1999 | Maeda | 188/264 P |
| 6,006,869 | A * | 12/1999 | Rancourt et al. | 188/71.5 |
| 6,148,980 | A * | 11/2000 | Patel et al. | 192/52.4 |

(Continued)

OTHER PUBLICATIONS

Tanner et al., "Adsorption and Desorption Effects on Carbon Brake Material Friction and Wear Characteristics," located at http:www.sglcarbon.com/sgl_t/brakedisc/index.html, 2 pages, 2005.

(Continued)

*Primary Examiner* — Xuan Lan Nguyen
(74) *Attorney, Agent, or Firm* — Klintworth & Rozenblat IP LLC

(57) ABSTRACT

A braking system for a high speed, high load rotor operating in a vacuum and suspended by a magnetic field such as in a flywheel energy storage device includes a pair of calipers disposed on opposed sides of the rotor for actuating a pair of annular friction discs into engagement with opposed sides of the rotor. Each caliper includes a mounting ring on its outer edge and an inner shallow annular groove in which it disposed one of the friction discs. A circulating fluid under pressure is directed into each annular groove for urging each friction disc into engagement with one of the opposed surfaces of the rotor for safely bringing the rotor to a stop such as in an emergency. The circulating fluid removes the heat generated by the braking action, while the controlled pressure applied by the discs also controls the position of the rotor when static such as during initialization.

23 Claims, 4 Drawing Sheets

U.S. PATENT DOCUMENTS 6,305,506 B1   10/2001   Shirai et al.
6,648,104 B1   11/2003   Buckley et al.
6,719,106 B1 *  4/2004   Gardner .................. 188/134

OTHER PUBLICATIONS

Krenkel, "High Performance C/C-SiC Brake Pads," Ceramic Engineering and Science Proceedings, vol. 25, No. 4, pp. 191-196, Abstract Only, 2004.

Teo et al., "Effect of Thermal Property Variation on Surface Grooving," Transactions of ASME, vol. 124, pp. 274-275, 2002.

Bill et al., "Friction and Wear of Carbon-Graphite Materials for High-Energy Brakes," NASA Technical Note, NASA TN D-8006, 29 pages, 1975.

Starfire Systems, Ceramic Composite Brake Technology, located at http://www.starfiresystems.com/download/cfm/STARBlade_Data_Sheet_Oct_06.pdf?AssetID-113, 2 pages, 2007.

Remond et al., "Two Experimental Methods to Measure the Damaged Subsurface of Carbon-Carbon Brake Discs," Applied Composite Materials, 6, pp. 185-201, Abstract Only, 1 page, 1999.

* cited by examiner

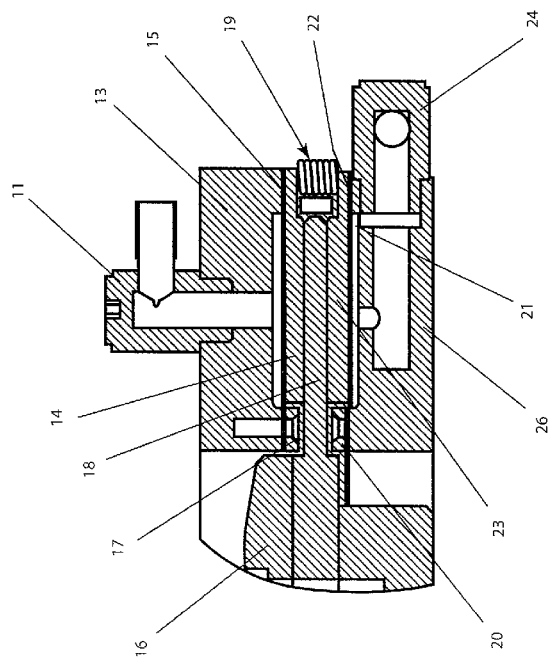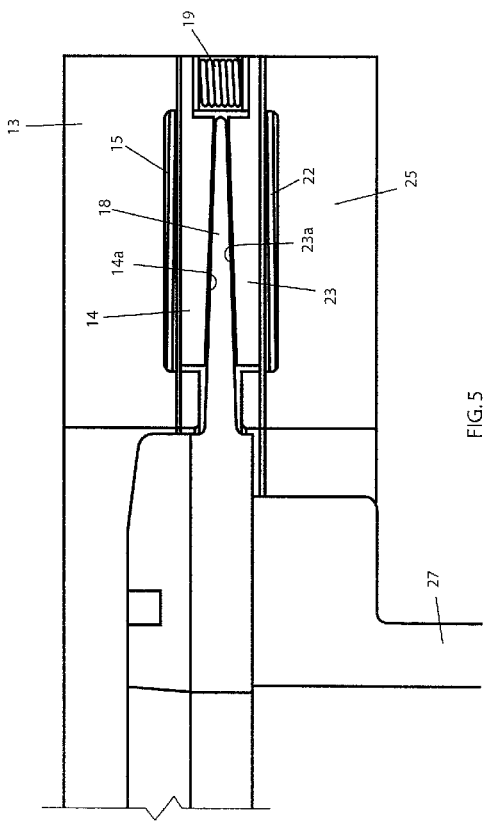

BRAKING SYSTEM FOR HIGH SPEED AND POWER ROTATING MACHINERY

FIELD OF THE INVENTION

This invention relates generally to a braking system for a high speed, high load rotating system, such as a flywheel energy storage device, which also dissipates energy generated during braking.

BACKGROUND OF THE INVENTION

Disc brakes are commonly used in various applications such as in vehicles for slowing or stopping the vehicle. Disc brakes are also connected to the output shaft of a prime mover, such an internal combustion engine, for measuring the output power as in a dynamometer. Disc brakes are also increasingly being used in high energy storage devices employing a rotating flywheel for controlling the speed of rotation of the flywheel. In these types of applications, the disc brake engages a moving rotor for controlling the speed, or even stopping, the rotor.

In a high speed flywheel energy storage device, the flywheel rotor is often magnetically suspended and operates at very high speeds. These types of flywheel rotors typically have a composite composition and are the product of extensive design and development efforts and are expensive. Stopping a rotor such as for an emergency requires the application of a large torque on the rotor resulting in the generation of large amounts of heat which can damage or destroy the rotor and other energy storage device components. An emergency may arise because of a loss of cryostat cooling, a loss of vacuum within which the flywheel rotor operates, or the loss of the energy storage device's computer control system. In any of these cases, it is of the utmost importance to safely and quickly bring the flywheel rotor to a complete stop so as to avoid damaging the system or injuring operating personnel. In addition, for safety and operating purposes, it is essential that the rotor be precisely located vertically and laterally within the energy storage device particularly during initiation of the operation of the flywheel energy storage device using magnetic bearings. To date, the inability to safely stop a high speed, high energy magnetically suspended flywheel rotor in an energy storage device and to consistently and precisely position the rotor within the energy storage device have limited the use of these types of devices in commercial environments and applications.

One embodiment of the present invention addresses the aforementioned limitations of the prior art by providing a safe and efficient braking system for a high speed, high load rotor magnetically suspended in a flywheel energy storage device and also provides the capability for consistently and accurately positioning the rotor within the energy storage device particularly at initiation of operation of the device.

SUMMARY OF THE INVENTION

The brake mechanism of the present invention includes a pair of annular brake pads disposed adjacent opposed surfaces of a flywheel rotor. The brake friction surfaces, which are kept apart by springs during normal flywheel operation, contact the full annular surface area of both sides of the rotor when the brake is applied. By applying pressure to the lower half of the brake caliper, a lifting force is provided which, when precisely controlled, allows the static flywheel rotor to be suspended at the desired height for chilling the superconducting bearing cryostat and setting the magnetic suspension height of the flywheel rotor before commencing rotor spinning. The brake mechanism also laterally restricts movement of the flywheel rotor when not in motion for precise positioning of the rotor within the brake mechanism. During brake applications, cooling water or hydraulic fluid is forced under pressure through the caliper's passages, providing a clamping force and removing the heat generated by the engagement of the friction materials. The present invention is capable of operating with water which has inefficient hydraulic fluid characteristics because the inventive brake mechanism provides a large braking force area of application and is capable of accommodating the lower pressure requirements of water. In the event the rotor drifts out of its permitted vertical envelope, an external system not part of the present invention applies braking on the spinning rotor. In the event vibration causes the rotor to leave its predetermined safe lateral envelope of operation, the annular brake pads apply a radially inward force on the rotor for maintaining the required rotor lateral positioning. The brake calipers may be replaced as a "cartridge" and can be replaced as necessary without affecting any other part or component of the flywheel system. The frictional components of the brake mechanism can be easily replaced as an assembly such as where system requirements dictate that the friction components be a one time use item such as when used in an emergency.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a partial, enlarged sectional view of a portion of the brake system shown in FIG. 3; and FIG. 5 is a partial sectional view of the brake system of the present invention illustrating the taper of the rotor and the upper and lower brake pads.

DETAILED DESCRIPTION OF THE PREFERRED EMBODIMENTS

Figure 1:
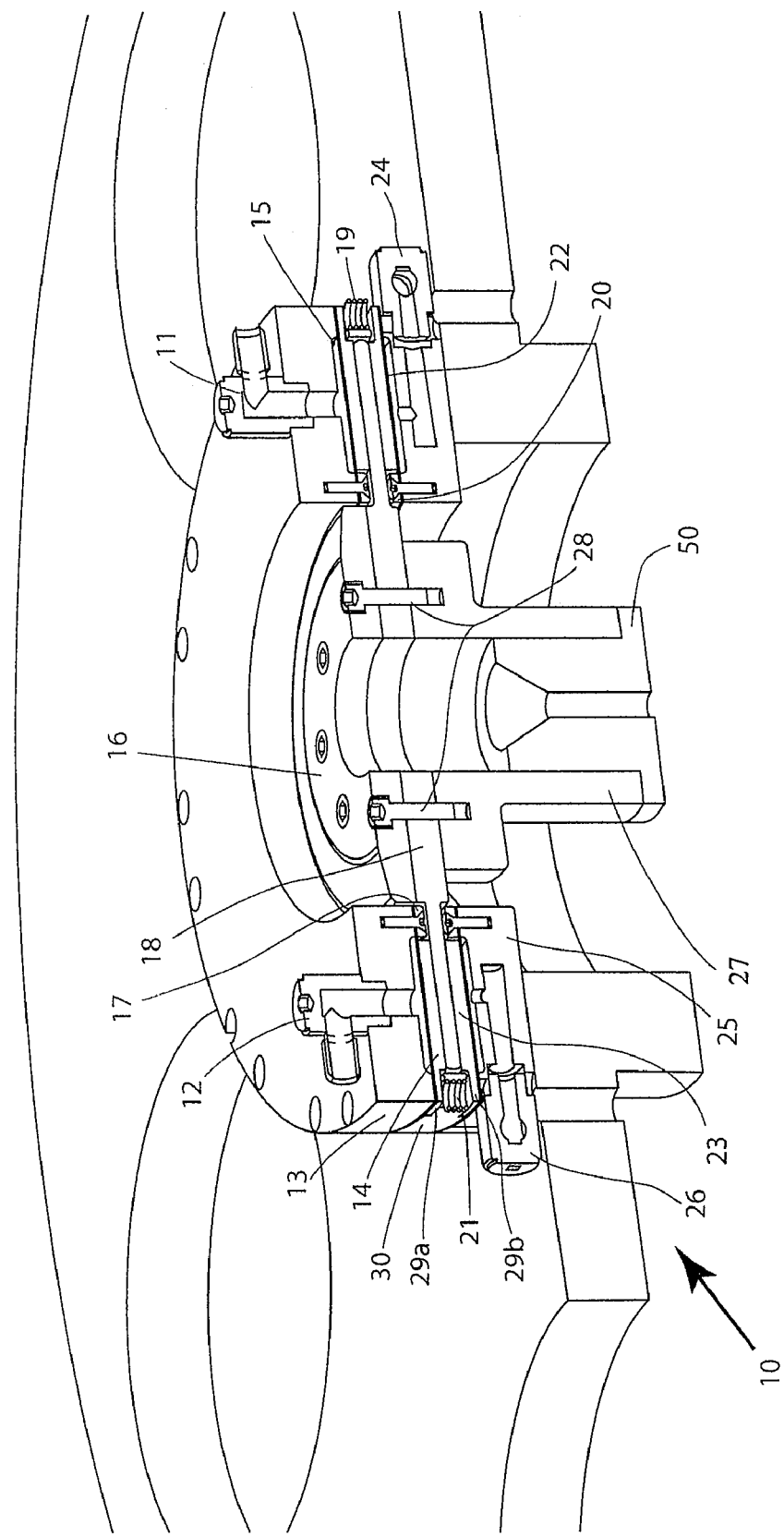
FIG. 1 is a perspective, partially cutaway view of a braking system for high speed and power rotating machinery in accordance with the principles of the present invention.
Figure 2:
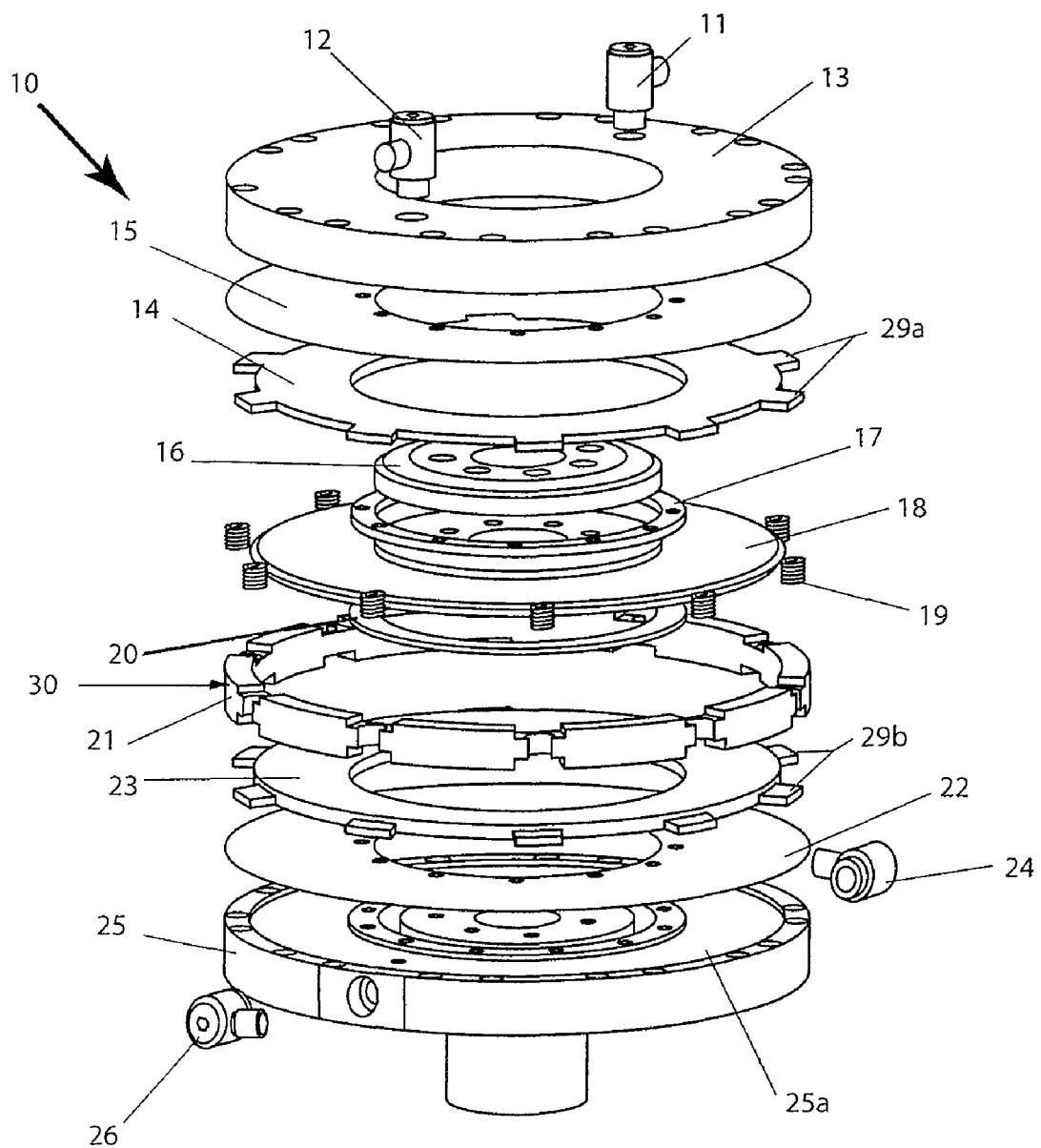
FIG. 2 is an exploded perspective view of the brake system of the present invention.
Figure 3:
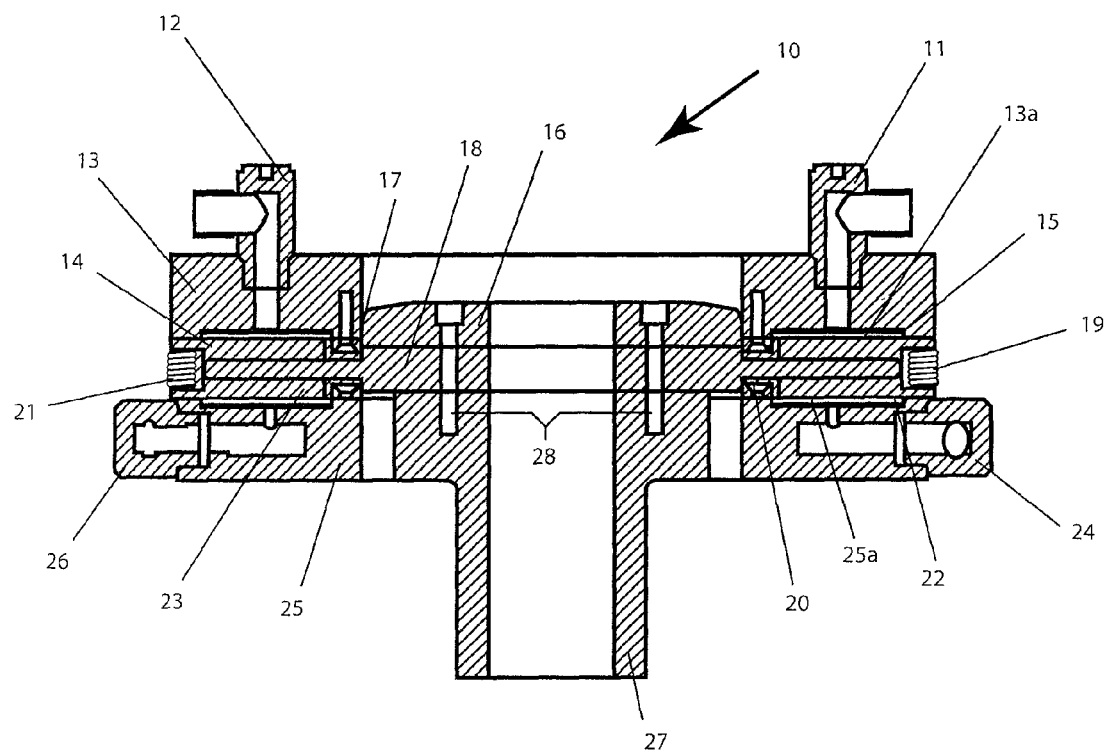
FIG. 3 is a vertical sectional view of the brake system of the present invention.

Referring to FIG. 1, there is shown a perspective, partially cutaway view of a brake system 10 in accordance with the principles of the present invention. FIGS. 2 and 3 are respectively exploded perspective and vertical sectional views of the brake system 10. FIGS. 4 and 5 are partial, enlarged sectional views of portions of the brake system 10 shown in FIG. 3.

The brake system 10 of the present invention includes a brake disc rotor 18 attached to a main shaft 27 as well as to a rotating body 50 by means of a retainer plate 16 and plural threaded bolts 28 concentrically disposed in a spaced manner about aligned center apertures in each of the retainer plate, brake disc rotor and main shaft. The brake disc rotor 18 is preferably comprised of a high strength, annular heat resistant composite material, such as carbon-carbon, and is disposed between first and second annular brake disc pads 14 and 23.

Each of the first and second brake disc pads 14 and 23 includes respective plural spaced projections, or teeth, 29*a* and 29*b* disposed about the outer periphery of the brake disc pad. Each of the plural projections 29*a* and 29*b* of the first and second brake disc pads 14 and 23 engage a respective recess, or dog, 21 on the outer periphery of a ring 30 fixedly positioned between the first and second brake disc pads. The recesses 21 are arranged in a spaced manner about ring 30. The first and second brake disc pads 14, 23 are prevented from rotating by engagement of their respective teeth 29*a* and 29*b* with the spaced peripheral recesses 21 in ring 30. When pressure is not applied to the first and second caliper half housings 13 and 25, plural coil springs 19 disposed about the brake disc rotor 18 in a spaced manner maintain the first and second brake disc pads 14 and 23 in spaced relation from the brake disc rotor 18. The plural resilient, coil springs 19 are in the form of resilient members which function as displacement means by engaging and urging the first and second brake disc pads 14 and 23 in a direction away from the brake disc rotor 18.

First and second caliper halves respectively include a first caliper half housing 13 and first fluid bladder, or moveable member, 15 and a second caliper half housing 25 and second fluid bladder, or moveable member, 22. While brake system 10 is described herein as including first and second caliper half housings 13 and 25, the present invention is not limited to this configuration as it may also be in the form of a single integrated structure or may be comprised of more than two outer housings. The term "bladder" is used herein to designate structure which forms a portion of a hollow structure, or cavity, as described in detail below. Each of the first and second fluid bladders 15 and 22 is in the form of an annular disc preferably comprised of stainless steel, titanium or carbon fibers. Each of the first and second fluid bladders 15 and 22 is attached about its respective outer periphery to the first and second caliper half housings 13 and 25 by means of recesses 21 disposed on ring 30. The first and second fluid bladders 15 and 22 are also attached about their inner peripheries to the first and second caliper half housings 13 and 25 by means of respective retainer rings 17 and 20. Retainer rings 17 and 20 act as a seal by means of a clamping force to prevent the escape of hydraulic fluid from the cavities formed between the first and second fluid bladders 15 and 22 and the first and second caliper half housings 13 and 25, respectively. While the first and second fluid bladders 15, 22 are described as being in the form of annular discs, these moveable members could also be in the form of virtually any annular structure responsive to an increase in hydraulic pressure for applying a mechanical force to an adjacent brake pad.

First paired outlet and inlet fluid fittings 11 and 12 direct hydraulic fluid under pressure into and out of the annular channel 13*a* in the first caliper half housing 13, while second paired inlet and outlet fluid fittings 26 and 24 direct hydraulic fluid into and out the annular channel 25*a* in the second caliper half housing 25. The outlet and inlet fluid fittings 11, 12 and 24, 26 are preferably coupled to a closed fluid system (not shown for simplicity) to allow the fluid to be recirculated through the brake system 10, but may also operate with an open, noncirculating fluid system. The outlet and inlet fluid fittings 11, 12 and 24, 26 are preferably displaced 180° from one another on the first and second caliper half housings 13 and 25, respectively. The aforementioned cavities discussed above are formed within the first and second annular recesses 13*a*, 25*a* between the first caliper half housing 13 and the first fluid bladder 15 and between the second caliper half housing 25 and the second, fluid bladder 22, respectively.

During brake application, hydraulic fluid is pumped continuously under pressure from the inlet fittings 12 and 26 respectively into the annular channel 13*a* of the first caliper half housing 13 as well as into the annular channel 25*a* of the second caliper half housing 25. Hydraulic pressure forces the first and second fluid bladders 15 and 22 against the first and second brake disc pads 14 and 23, respectively, so as to overcome the opposing pressure of springs 19 which creates friction against the brake disc rotor 18. Heat generated by friction between the first and second brake disc pads 14 and 23 and the brake disc rotor 18 is transmitted to and absorbed by the hydraulic fluid within the first and second fluid bladders 15 and 22. The heated hydraulic fluid is directed out of the first and second fluid bladders 15 and 22 via the first and second outlet fittings 11 and 24, respectively, and the heat is dissipated by an external system not part of this invention. It is in this manner that heat is safely and efficiently removed from the brake system during operation. Significantly, the fluid provided under pressure to the brake system 10 has a dual function. It is used to mechanically actuate the brake and to thermally remove heat from the brake.

When the brake disc rotor 18 is at rest, such as prior to initialization of operation, the brake disc rotor engages and is supported in a secure manner by the second brake disc pad 23. As shown in the partial sectional view of FIG. 5, the upper surface 23*a* of the second brake disc pad 23 is tapered downwardly in proceeding radially inwardly to provide a self-centering function for the brake disc rotor 18 when at rest as well as when braking action is applied to the brake disc rotor. Similarly, the lower surface 14*a* of the first brake disc pad 14 is tapered upwardly in proceeding radially inwardly to also provide a self-centering function for the brake disc rotor when at rest as well as when braking action is applied to the brake disc rotor 18. The angle of taper is preferably less than 1°. It is in this manner that the brake disc rotor 18 is restrained in movement vertically and horizontally, or laterally, prior to operation as well as during operation to ensure that it stays within precisely defined positioning criteria.

The disclosed embodiment provides an improved brake for stopping or controlling the speed of a magnetically suspended flywheel rotor in a high energy storage device which is also capable of safely and efficiently removing heat generated during braking of the rotor.

The disclosed embodiment also provides a braking system for safely stopping a magnetically suspended high speed rotor in an energy storage device under vacuum which is also capable of consistent and accurate positioning of the rotor vertically and laterally during initialization of operation within the energy storage device.

The disclosed embodiment further provides a friction braking for a magnetically suspended, high energy flywheel rotor in an energy storage machine wherein the brake pad calipers can be easily removed and replaced as an assembly without affecting or involving any other component of the energy storage machine.

The disclosed embodiment still further provides an improved disc brake wherein the spinning rotor is engaged on opposed surfaces by a pair of annular discs for maximum braking surface engagement.

While particular embodiments of the present invention have been shown and described, it will be obvious to those skilled in the relevant arts that changes and modifications may be made without departing from the invention in its broader aspects. For example, while the present invention has been describe primarily in terms of use with a flywheel rotor in an energy storage device, the inventive braking system is also applicable for use in virtually any system incorporating high speed or high power rotating machinery, such as in dynamometer measuring systems. In addition, while the invention has been described for use with a magnetically suspended flywheel rotor, the inventive brake system can equally as well be used with a flywheel rotor suspended either electromagnetically or by superconductors or by means of mechanical bearings. Finally, while the axis of the spinning rotor is shown in the various figures as aligned generally vertically, a rotor used with the braking system of the present invention may have virtually any orientation. Therefore, the aim in the appended claims is to cover all such changes and modifications as fall within the true spirit and scope of the invention. The manner set forth in the foregoing description and accompanying drawings is offered by way of illustration only and not as a limitation. The actual scope of the invention is intended to be defined in the following claims when viewed in their proper perspective based on the prior art.

We claim:

1. A hydraulic brake system for high speed, rotating machinery comprising:
   a rotor connected to a shaft, said rotor configured to spin while suspended magnetically, electromagnetically, or by superconductors;
   at least one housing disposed adjacent to said rotor and defining at least one channel configured for flow of a fluid;
   at least one moveable member in the housing responsive to flow of said fluid for actuation of the brake system; and
   at least one tapered brake pad disposed between said moveable member and the rotor;
   wherein said at least one moveable member seals said fluid in said at least one channel away from said at least one tapered brake pad and said rotor; when said fluid is directed under pressure against said at least one moveable member said fluid urges said at least one moveable member into engagement with the at least one tapered brake pad causing the at least one tapered brake pad to engage the rotor to apply a braking force to said rotor, and removes frictional heat generated by the braking action from the brake system; and said at least one tapered brake pad is configured to self-center the rotor, in order to prevent horizontal and vertical movement of the rotor, when said at least one tapered brake pad applies the braking force on said rotor while the rotor is spinning and suspended magnetically, electromagnetically, or by superconductors.

2. The brake system of claim 1 further comprising:
   first and second housings disposed on opposed sides of said rotor and respectively defining first and second channels configured for flow of said fluid;
   first and second moveable members respectively disposed in said first and second housings and in facing relation to said rotor, wherein said first and second moveable members are responsive to flow of said fluid in said first and second channels, respectively, for actuation of the brake system; and
   first and second tapered brake pads respectively disposed between first said moveable member and a first surface of said rotor and between said second moveable member and a second opposed surface of said rotor;
   wherein the system is configured such that said fluid under pressure directed through said first and second channels of said first and second housings urges said first and second moveable members respectively into engagement with said first and second tapered brake pads causing said first and second tapered brake pads respectively to engage the first and second surfaces of said rotor to apply a braking force to said rotor, and removes the frictional heat from the brake system.

3. The brake system of claim 2 wherein said first and second housings include said first and second channels, respectively, and said first moveable member is disposed in said first channel and said second moveable member is disposed in said second channel, and wherein said fluid is directed continuously under pressure through said first and second channels.

4. The brake system of claim 3 wherein said first and second channels and said first and second tapered brake pads are annular in shape.

5. The brake system of claim 3 wherein said first and second moveable members are bladders.

6. The brake system of claim 5 wherein said first and second bladders are each in the form of a flat annular disc.

7. The brake system of claim 6 wherein each of said flat annular discs is comprised of stainless steel, titanium or carbon fibers.

8. The brake system of claim 2 further comprising first and second pairs of fluid inlet and outlet fittings respectively coupled to said first and second housings for directing said fluid through said first and second housings in a controlled manner.

9. The brake system of claim 8 wherein said first and second housings are generally circular, and wherein said inlet and outlet fittings are displaced 180° from one another on said housings.

10. The brake system of claim 2 further comprising displacement means for urging said first and second tapered brake pads away from said rotor.

11. The brake system of claim 10 wherein said displacement means includes at least one resilient member disposed between and engaging said first and second tapered brake pads and urging said tapered brake pads away from said rotor.

12. The brake system of claim 11 wherein said displacement means includes plural resilient springs disposed about the peripheries of said first and second tapered brake pads in a spaced manner.

13. The brake system of claim 12 wherein said plural resilient springs are coil springs.

14. The brake system of claim 2 further comprising a ring disposed about said rotor and engaging and preventing rotation of said first and second tapered brake pads while allowing said tapered brake pads to move toward and away from said rotor.

15. The brake system of claim 14 wherein said ring includes plural spaced recesses about its outer periphery and each of said first and second tapered brake pads includes plural spaced projections disposed about its outer periphery, and wherein each spaced projection is adapted for fixed positioning within a respective spaced recess.

16. The brake system of claim 2 wherein said second tapered brake pad is disposed below said rotor, and said second tapered brake pad engages said rotor and maintains said rotor in a fixed vertical and horizontal position when said rotor is not spinning nor suspended.

17. The brake system of claim 16 wherein said second tapered brake pad is tapered downwardly in proceeding radially inward toward the center of said second tapered brake pad for controlling horizontal and vertical movement of said rotor when said rotor is not spinning.

18. The brake system of claim 17 wherein said first tapered brake pad is tapered upwardly in proceeding radially inward toward the center of said first tapered brake pad.

19. The brake system of claim 1 wherein said machinery includes a high energy storage device.

20. The brake system of claim 1 wherein said machinery includes a dynamometer.

21. A hydraulic brake system for high speed, rotating machinery comprising:
   a rotor connected to a generally vertical shaft in the machinery, said rotor configured to spin while suspended magnetically, electromagnetically, or by superconductors;
   first and second housings disposed, respectively, above and below said rotor and including first and second moveable members, respectively;
   first and second tapered brake pads respectively disposed between said first movable member and the upper surface of said rotor and between the second moveable member and the lower surface of said rotor; and
   fluid under pressure directed through said first and second housings for urging said first and second movable members into contact with said first and second tapered brake pads, respectively, and for urging causing said first and second tapered brake pads to contact the upper and lower surfaces, respectively, of said rotor to apply a braking force thereon, wherein said fluid is sealed away from said first and second tapered brake pads and away from said spinning rotor by said first and second moveable members;
   wherein said tapered brake pads are configured to self-center the rotor, in order to prevent horizontal and vertical movement of the rotor, when said tapered brake pads apply the braking force on said rotor while the rotor is spinning and suspended magnetically, electromagnetically, or by superconductors.

22. The brake system of claim 21 wherein said fluid is hydraulic fluid or water under pressure.

23. An improved method for applying a braking force to a spinning suspended rotor comprising the steps of:
   positioning at least one housing adjacent to the rotor, wherein said at least one housing includes a channel configured for flow of a fluid;
   providing at least one movable member in communication with said channel in the housing, wherein said at least one movable member is responsive to the flow of said fluid in the channel for moving from a first position to a second position;
   positioning at least one tapered brake pad between said at least one movable member and the rotor, with said at least one moveable member sealing said fluid in said channel away from said at least one tapered brake pad and said rotor;
   spinning and suspending the rotor magnetically, electromagnetically, or by superconductors;
   directing said fluid under pressure against said at least one moveable member thereby moving said at least one movable member and causing said at least one moveable member to move said at least one tapered brake pad into engagement with said spinning and suspended rotor thereby applying the braking force to said spinning and suspended rotor; and
   preventing horizontal and vertical movement of the spinning and suspended rotor, due to said at least one tapered brake pad self-centering the rotor, while said at least one tapered brake pad applies the braking force to said spinning and suspended rotor.

* * * * *